United States Patent
Prabu et al.

(10) Patent No.: US 10,034,045 B2
(45) Date of Patent: Jul. 24, 2018

(54) ANTICIPATORY PROGRAM MAP TABLE INFORMATION ACQUISITION

(71) Applicant: ARRIS Enterprises, Inc., Suwanee, GA (US)

(72) Inventors: Mahadevan Venkatesh Prabu, Bangalore (IN); Belmannu Harekrishna Acharya, Bangalore (IN)

(73) Assignee: ARRIS Enterprises LLC, Suwanee, GA (US)

( * ) Notice: Subject to any disclaimer, the term of this patent is extended or adjusted under 35 U.S.C. 154(b) by 38 days.

(21) Appl. No.: 14/727,233

(22) Filed: Jun. 1, 2015

(65) Prior Publication Data

US 2016/0353159 A1 Dec. 1, 2016

(51) Int. Cl.
| | |
|---|---|
| H04N 21/44 | (2011.01) |
| H04N 21/434 | (2011.01) |
| H04N 21/435 | (2011.01) |
| H04N 21/437 | (2011.01) |
| H04N 21/438 | (2011.01) |
| H04N 21/81 | (2011.01) |
| H04N 21/458 | (2011.01) |
| H04N 21/236 | (2011.01) |

(52) U.S. Cl.
CPC . *H04N 21/44016* (2013.01); *H04N 21/23605* (2013.01); *H04N 21/435* (2013.01); *H04N 21/437* (2013.01); *H04N 21/4343* (2013.01); *H04N 21/4345* (2013.01); *H04N 21/4383* (2013.01); *H04N 21/458* (2013.01); *H04N 21/812* (2013.01); *H04N 21/8106* (2013.01)

(58) Field of Classification Search
CPC ........... H04N 21/236; H04N 21/23605; H04N 21/434; H04N 21/4343; H04N 21/44016; H04N 21/812
USPC ..................................... 725/32–36
See application file for complete search history.

(56) References Cited

U.S. PATENT DOCUMENTS

| | | | |
|---|---|---|---|
| 6,449,352 B1 * | 9/2002 | Takahashi | H04N 21/23608 375/E7.022 |
| 6,778,533 B1 * | 8/2004 | Kovacevic | H04N 21/23608 725/95 |
| 8,634,310 B2 | 1/2014 | Singhai et al. | |
| 2001/0001024 A1 * | 5/2001 | Yanagihara | H04N 21/235 386/200 |
| 2013/0014171 A1 * | 1/2013 | Sansom | H04N 21/43615 725/52 |

* cited by examiner

*Primary Examiner* — Jeremy S Duffield
(74) *Attorney, Agent, or Firm* — Bart A. Perkins (57) ABSTRACT

Methods, systems, and computer readable media can be operable to facilitate the anticipatory acquisition of PMT information. A device may recognize a trigger within a transport stream, wherein the trigger indicates an audio/video transition and initiates a PMT acquisition by the device. Upon acquisition of the PMT, the device may process information carried by the transport stream after the audio/video transition. In embodiments, a device may acquire a PMT having information associated with a planned audio/video transition, wherein the information includes a time reference for when the audio/video transition will occur and information that may be used by the device to process information carried by the transport stream after the audio/video transition.

7 Claims, 6 Drawing Sheets

ANTICIPATORY PROGRAM MAP TABLE INFORMATION ACQUISITION

TECHNICAL FIELD

This disclosure relates to acquisition of program map table information.

BACKGROUND

A set-top box (STB) is typically provided by a multiple-system operator (MSO) to a subscriber so that the subscriber may receive multimedia services offered by the MSO. The STB can be used by the subscriber to access a variety of multimedia services, including but not limited to live or linear television, digital video recorder (DVR) content, video-on-demand (VoD) content, over-the-top (OTT) content, and others.

Generally, in order to process and output a piece of multimedia content, a STB needs to be able to identify and decode information associated with the multimedia content that is delivered to the STB. For example, audio and video information associated with a piece of multimedia content may be delivered to a STB as one or more elementary streams of a transport stream, and the STB may retrieve information from a program map table (PMT) carried by the transport stream in order to identify and decode the audio and video information. A PMT (e.g., PMT of a Moving Picture Experts Group (MPEG) transport stream) may include information associated with a channel or program such as audio packet identifiers (PIDs), video PIDs, program clock reference (PCR) PIDs, data PIDs, metadata associated with the channel or program, and other information.

Typically, a STB will acquire a PMT according to a predetermined PMT polling period. However, when an audio/video transition occurs (e.g., channel change, targeted advertisement (TAD) switch, changes to current audio PIDs or video PIDs, changes to audio/video parameters, and/or other conditions or events), new audio/video information may be received at the STB in between PMT acquisitions, and without the PMT information associated with the new audio/video information, the STB may be unable to immediately retrieve and process the new audio/video information. After an audio/video transition, and before a new PMT is acquired by the STB, a viewer may miss portions of the multimedia content that is being requested from the STB. Therefore, it is desirable to improve upon methods and systems for retrieving PMT information after an audio/video transition.

BRIEF DESCRIPTION OF THE DRAWINGS

Like reference numbers and designations in the various drawings indicate like elements.

DETAILED DESCRIPTION

It is desirable to improve upon methods and systems for acquiring audio/video associated with content requested at a device. Methods, systems, and computer readable media described herein can be operable to facilitate the anticipatory acquisition of PMT information. A device may recognize a trigger within a transport stream, wherein the trigger indicates a multimedia transition (e.g., audio/video transition) and initiates a PMT acquisition by the device. Upon acquisition of the PMT, the device may process information carried by the transport stream after the audio/video transition. In embodiments, a device may acquire a PMT having information associated with a planned audio/video transition, wherein the information includes a time reference for when the audio/video transition will occur and information that may be used by the device to process information carried by the transport stream after the audio/video transition.

An embodiment of the invention described herein may include a method comprising: (a) receiving multimedia associated with a first piece of content through a transport stream; (b) receiving a multimedia transition request, wherein the multimedia transition request initiates the reception of multimedia associated with a second piece of content through the transport stream; (c) identifying a trigger within the transport stream, wherein the trigger signals the initiation of a program map table acquisition; (d) in response to identifying the trigger within the transport stream, acquiring a program map table from the transport stream, wherein the program map table comprises program information associated with the second piece of content; and (e) acquiring the multimedia associated with the second piece of content using the program information associated with the acquired program map table.

According to an embodiment of the invention, the program map table comprises information associated with a scheduled multimedia transition.

According to an embodiment of the invention, the information associated with the scheduled multimedia transition comprises a reference identifying a time at which the scheduled multimedia transition will occur.

According to an embodiment of the invention, the method may include when the identified time associated with the scheduled multimedia transition arrives, acquiring multimedia received after the multimedia transition using information retrieved from the program map table.

According to an embodiment of the invention, the program map table is acquired before an associated program map table polling period expires.

According to an embodiment of the invention, the trigger comprises a program clock reference discontinuity flag.

According to an embodiment of the invention, the trigger is identified from an elementary stream within the transport stream.

According to an embodiment of the invention, the multimedia transition request comprises a targeted advertisement switch.

An embodiment of the invention described herein may include an apparatus comprising: (a) an interface configured to be used to receive multimedia associated with a first piece of content through a transport stream; (b) an interface configured to be used to receive a multimedia transition request, wherein the multimedia transition request initiates the reception of multimedia associated with a second piece of content through the transport stream; and (c) a module configured to: (i) identify a trigger within the transport stream, wherein the trigger signals the initiation of a program map table acquisition; (ii) in response to identifying the trigger within the transport stream, acquire a program map table from the transport stream, wherein the program map table comprises program information associated with the second piece of content; and (iii) acquire the multimedia associated with the second piece of content using the program information associated with the acquired program map table.

An embodiment of the invention described herein may include one or more non-transitory computer readable media having instructions operable to cause one or more processors to perform the operations comprising: (a) receiving multimedia associated with a first piece of content through a transport stream; (b) receiving a multimedia transition request, wherein the multimedia transition request initiates the reception of multimedia associated with a second piece of content through the transport stream; (c) identifying a trigger within the transport stream, wherein the trigger signals the initiation of a program map table acquisition; (d) in response to identifying the trigger within the transport stream, acquiring a program map table from the transport stream, wherein the program map table comprises program information associated with the second piece of content; and (e) acquiring the multimedia associated with the second piece of content using the program information associated with the acquired program map table.

Figure 1:
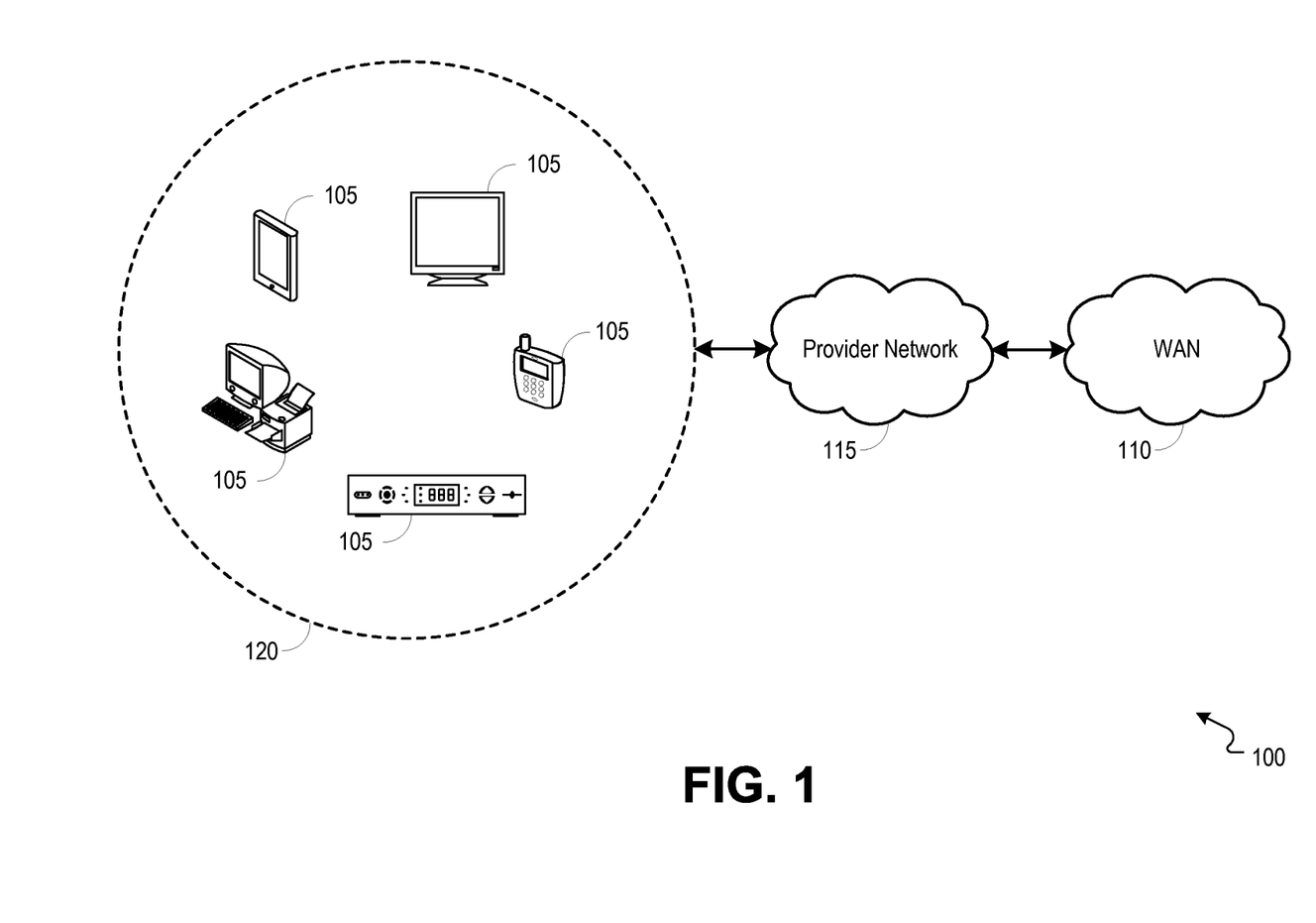
FIG. 1 is a block diagram illustrating an example network environment operable to facilitate the anticipatory acquisition of PMT information.

FIG. 1 is a block diagram illustrating an example network environment 100 operable to facilitate the anticipatory acquisition of PMT information. In embodiments, video, voice, and/or data services may be delivered to one or more client devices 105. Client devices 105 may include a television, mobile device, tablet, computer, set-top box (STB), telephone, gaming device, and any other device operable to receive video, voice, and/or data services. It should be understood that various data, multimedia, and/or voice services may be delivered to the client devices 105, including but not limited to, live or broadcast television, video-on-demand (VoD) content, pay-per view content, recorded content (e.g., DVR content), audio-only content, streaming content, and others. It should be further understood that the devices shown in FIG. 1 may be integrated. For example, a television may be connected to and controlled by a STB.

In embodiments, multiple services (e.g., video, voice, and/or data services) may be delivered from a wide-area network (WAN) 110 to a client device 105 through a connection between the client device 105 and a provider network 115. The provider network 125 may include an optical network, hybrid fiber coaxial (HFC) network, digital subscriber line (DSL) network, twisted-pair, mobile network, high-speed data network, MoCA network, and others. Multiple systems operator (MSO) or service provider devices and/or networks within the WAN 120 may be used to provide, manage, and/or troubleshoot the multiple services provided to subscribers.

In embodiments, multiple services may be delivered to client devices 105 through a local network 120. The local network 120 may include a local area network (LAN), wireless local area network (WLAN), personal area network (PAN), Multimedia over Coax Alliance (MoCA) network, mobile hotspot network, and others. The local network 120 may be provided at a subscriber premise by a central device (not shown). The central device may include any device configured to facilitate communications between one or more client devices and an upstream network, such as a gateway, modem or other access device. The central device may be integrated with other devices. For example, a modem may reside within a gateway device, STB, or other devices. It will be appreciated by those skilled in the relevant art that delivery of the multiple services over the local network 110 may be accomplished using a variety of standards and formats.

In embodiments, multimedia content may be delivered to a client device 105 as a transport stream carried by a channel (e.g., broadcast or linear channel, high-speed data channel, VoD channel, etc.). When the client device 105 is tuned to a certain channel, the client device 105 can identify and decode certain information within the transport stream, the certain information being associated with a piece of content that is of interest to a user. A transport stream may include a plurality of streams including, but not limited to a video stream, audio stream, data stream, and others.

In embodiments, a client device 105 may identify individual packets and/or streams that are to be decoded and output based upon information received from a PMT. A PMT (e.g., PMT of a Moving Picture Experts Group (MPEG) transport stream) may include program information associated with a channel or program such as audio PIDs, video PIDs, program clock reference (PCR) PIDs, data PIDs, metadata associated with the channel or program, and other information. Using program information received from a PMT, a client device 105 may decode information carried by one or more streams within an associated transport stream. For example, a client device 105 may identify an audio and a video stream from within a transport stream, the identified audio and video streams being associated with content that is of interest to a user. The client device 105 may decode packets carried by the audio and video streams to produce an audio/video output of the content, and the audio/video output may be presented to the user.

In embodiments, when a client device 105 has acquired information used to identify and decode audio/video information for a piece of content, a condition or event may occur that creates a need for the client device 105 to acquire new information for identifying and decoding audio/video information. For example, a need for new or updated PMT information may arise due to a channel change, targeted advertisement (TAD) switch, changes to current audio PIDs or video PIDs, changes to audio/video parameters, and/or other conditions or events. An audio/video transition may be initiated at a client device 105 upon the client device 105 receiving a multimedia transition (e.g., audio/video transition) request. The audio/video transition request may be received from within a media stream received by the client device 105 or may be received as user input from a user interface associated with the client device 105. In embodiments, the audio/video transition request may be received in the form of a channel change request, a TAD switch, changes to current audio PIDs or video PIDs, changes to audio/video parameters, and/or any other condition or event creating a need for new or updated information to be used in the acquisition of audio/video that is to be output from the client device 105.

In embodiments, when an audio/video transition request is received at a client device 105, a new transport stream or elementary stream(s) may be received or tuned to by the client device 105, and the client device 105 may be tuned to the new stream or streams without having the necessary information or parameters for decoding and processing the information carried by the new stream or streams. When a client device 105 receives or tunes to a new stream, the client device 105 may recognize any inconsistencies that exist between the previously received or tuned to stream and the stream that the client device 105 is currently receiving. For example, a program clock reference (PCR) field associated with packets within a stream may be used to synchronize decoding and output of elementary streams (e.g., audio stream, video stream, etc.) of a transport stream, and when a new stream is received or tuned to, the PCR field associated with the packets of the newly acquired stream may be inconsistent with or discontinuous from the packets of the previously acquired stream. The inconsistency or discontinuity in the PCR field may be introduced by setting a PCR discontinuity flag before the transition.

In embodiments, a client device 105 may identify a trigger for initiating a PMT acquisition. A client device 105 may receive and decode information carried within a transport stream to produce and output audio/video associated with a channel or piece of content to a display. In embodiments, the trigger for initiating a PMT acquisition may be identified from a packet within an elementary stream (e.g., video, audio, data stream, etc.) being processed by the client device 105, the packet serving to indicate that a new stream is being received by the client device 105. For example, when the audio/video transition request is received, the client device 105 may receive an updated or new stream, and inconsistencies or discontinuities between the original stream and the updated or new stream (e.g., inconsistencies or discontinuities that are introduced by the setting of a PCR discontinuity flag) may provide an indication of the transition between streams. In embodiments, the trigger may be a PCR discontinuity flag or bit. For example, when the PCR discontinuity bit of a packet is set to one (1), the client device 105 may determine that a new or different content stream is being received at the client device 105 and that a new or updated PMT may need to be acquired to decode and process the new or different content stream. It should be understood that other packet fields or flags may be used to provide an indication of a new content stream.

In embodiments, when a trigger for initiating a PMT acquisition is identified, a client device 105 may acquire a new or updated PMT. The new or updated PMT may be identified and retrieved from a PMT stream within an associated transport stream. Rather than wait for a PMT polling period to expire, once the client device 105 identifies a PMT acquisition trigger, the client device 105 can acquire the next PMT that is received within the PMT stream. The client device 105 can decode the acquired PMT to receive PMT information (e.g., audio PIDs, video PIDs, program clock reference (PCR) PIDs, data PIDs, metadata associated with the channel or program, etc.) associated with the transport stream that is being received at the client device 105. The PMT information may be stored locally at the client device 105.

In embodiments, a client device 105 may acquire a new or updated PMT or may initiate an acquisition of audio/video using new or updated PMT information at a predetermined time or upon receiving a certain packet within a received transport stream. For example, a PMT may include a reference or other information identifying a time at which an audio/video transition will occur within the currently received content. The time of the audio/video transition may be relative to a time-of-day, PCR data, time references within the content, or any other reference. As another example, a PMT may include information identifying a certain packet or packet type that may act as a signal of an impending audio/video transition. When the time for the audio/video transition arrives, or the signal of an impending audio/video transition is received, the client device 105 may initiate acquisition of the audio/video streams arriving at the client device 105 after the audio/video transition.

In embodiments, a PMT may include information for acquiring audio/video that will be received by a client device 105 after a scheduled or an upcoming audio/video transition. For example, the PMT may include audio PIDs, video PIDs, program clock reference (PCR) PIDs, data PIDs, metadata associated with the channel or program, and/or other information associated with audio/video streams that will be received by a client device 105 after a planned audio/video transition. The PMT information may include information that may be used by the client device 105 to identify and decode audio/video associated with new audio/video content that is to be acquired after an audio/video transition. The planned audio/video transition information may be stored locally at the client device 105. When a time for an audio/video transition arrives, or a signal of an impending audio/video transition is received at a client device 105, or an audio/video transition otherwise occurs at the client device 105, the client device 105 may initiate acquisition of the audio/video streams arriving at the client device 105 after the audio/video transition using the planned audio/video transition information. For example, when the planned audio/video transition occurs, the client device 105 may access the previously acquired planned audio/video transition information to identify and decode information carried by the received transport stream to produce content for output to a display.

In embodiments, with PMT information retrieved from the newly acquired PMT, the client device 105 may retrieve and decode information carried by the received transport stream to produce content for output to a display. For example, the client device 105 may use the PMT information (e.g., audio PIDs, video PIDs, program clock reference (PCR) PIDs, data PIDs, metadata associated with the channel or program, etc.) to identify and decode packets from the transport stream (e.g., elementary streams such as audio and video streams carried within the transport stream) that are used to produce an output of content for display to a user. The audio/video content may be output to a display associated with the client device 105.

Figure 2:
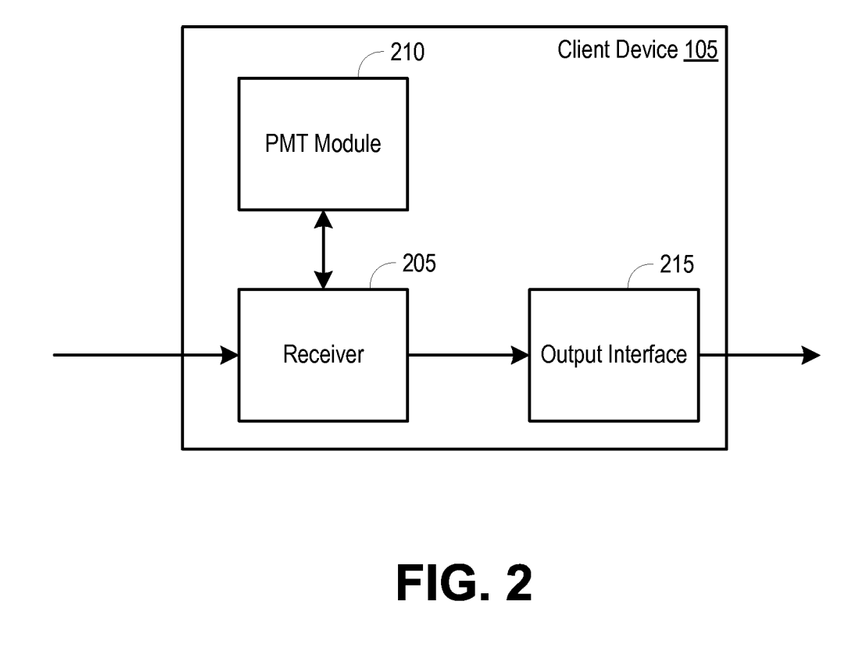
FIG. 2 is a block diagram illustrating an example client device operable to facilitate the anticipatory acquisition of PMT information.

FIG. 2 is a block diagram illustrating an example client device 105 operable to facilitate the anticipatory acquisition of PMT information. The client device 105 may include a receiver 205, a PMT module 210, and an output interface 215. In embodiments, the client device 105 may receive a transport stream through a receiver 205. The transport stream 220 may include one or more media streams 225 (e.g., audio stream, video stream, etc.) and one or more PMT streams 230.

In embodiments, multimedia content may be delivered to a client device 105 as a transport stream carried by a channel (e.g., broadcast or linear channel, high-speed data channel, VoD channel, etc.). When the client device 105 is tuned to a certain channel, the client device 105 can identify and decode certain information within the transport stream, the certain information being associated with a piece of content that is of interest to a user.

In embodiments, a client device 105 may identify individual packets and/or streams that are to be decoded and output based upon information received from a PMT (e.g., PMT1-5). A PMT (e.g., PMT of a Moving Picture Experts Group (MPEG) transport stream) may include information associated with a channel or program such as audio PIDs, video PIDs, program clock reference (PCR) PIDs, data PIDs, metadata associated with the channel or program, and other information. Information retrieved from a PMT may be stored at a PMT module 210, and the PMT module 210 may control the retrieval and decoding of information carried by the transport stream. For example, a PMT module 210, using PMT information associated with a received transport stream, may identify one or more media streams (e.g., audio and/or video stream) from within the transport stream, the identified audio and/or video streams being associated with content that is of interest to a user. The client device 105 may decode packets carried by the audio and video streams to produce an audio/video output of the content, and the audio/video output may be output to the user through the output interface 215.

In embodiments, when a client device 105 has acquired information used to identify and decode audio/video information for a piece of content, a condition or event may occur that creates a need for the client device 105 to acquire new information for identifying and decoding audio/video information. For example, a need for new or updated PMT information may arise due to a channel change, targeted advertisement (TAD) switch, changes to current audio PIDs or video PIDs, changes to audio/video parameters, and/or other conditions or events. An audio/video transition may be initiated at a client device 105 upon the client device 105 receiving an audio/video transition request. The audio/video transition request may be received from within a media stream received by the client device 105 or may be received as user input from a user interface associated with the client device 105. In embodiments, the audio/video transition request may be received in the form of a channel change request, a TAD switch, changes to current audio PIDs or video PIDs, changes to audio/video parameters, and/or any other condition or event creating a need for new or updated information to be used in the acquisition of audio/video that is to be output from the client device 105.

In embodiments, when an audio/video transition request is received at a client device 105, packets arriving at the client device 105 after the request is received may include information that is inconsistent with the information carried by packets that were received at the client device 105 prior to receiving the audio/video transition request. The client device 105 may recognize any inconsistencies that exist between the previously received packets and the packets that the client device 105 is currently receiving. For example, a program clock reference (PCR) field associated with packets within a media stream may be used to synchronize decoding and output of the media stream along with other media stream(s) carried by the transport stream, and when an audio/video transition occurs, the PCR field associated with the packets received after the audio/video transition may be inconsistent with or discontinuous from the packets of the previously acquired packets. The inconsistency or discontinuity in the PCR field may be introduced by setting a PCR discontinuity flag before transitioning to the new stream.

Packets received at a client device 105 after an audio/video transition request may require that the client device 105 retrieve different information or parameters to decode and/or process the new packets, thus the client device 105 may need to retrieve new or updated PMT information. In embodiments, a client device 105 may identify a trigger for initiating a PMT acquisition. The trigger for initiating a PMT acquisition may be identified from a packet within a media stream (e.g., video, audio, data stream, etc.) being processed by the client device 105, the packet serving to indicate that audio/video associated with content being requested at the client device 105 requires new or updated PMT information. For example, the client device 105 may identify a trigger within the media stream, and upon identification of the trigger, the client device 105 may acquire an associated PMT carried by the PMT stream. In embodiments, the trigger may be an inconsistency or discontinuity in packets received at the client device 105. For example, the trigger may be a PCR discontinuity bit, and when the PCR discontinuity bit of a packet is set to one (1), the client device 105 may determine that a new or different content stream is being received at the client device 105 and that a new or updated PMT may need to be acquired to decode and process the new or different content stream. It should be understood that other packet fields or flags may be used to provide an indication of a new content stream.

In embodiments, when a trigger for initiating a PMT acquisition is identified, the client device 105 may acquire a new or updated PMT. The new or updated PMT may be identified and retrieved from the PMT stream. The client device 105 can decode the acquired PMT to receive PMT information (e.g., audio PIDs, video PIDs, program clock reference (PCR) PIDs, data PIDs, metadata associated with the channel or program, etc.) associated with the transport stream that is being received at the client device 105. The PMT information may be stored at the PMT module 210.

In embodiments, a client device 105 may acquire a new or updated PMT or may initiate an acquisition of audio/video using new or updated PMT information at a predetermined time or upon receiving a certain packet within a received transport stream. For example, a PMT may include information identifying a time at which an audio/video transition will occur within the currently received content. The time of the audio/video transition may be relative to a time-of-day, PCR data, time references within the content, or any other reference. As another example, a PMT may include information identifying a certain packet or packet type that may act as a signal of an impending audio/video transition. When the time for the audio/video transition arrives, or the signal of an impending audio/video transition is received, the PMT module 210 may initiate acquisition of the audio/video streams arriving at the client device 105 after the audio/video transition.

In embodiments, a PMT may include information for acquiring audio/video that will be received by a client device 105 after a scheduled or an upcoming audio/video transition. For example, the PMT may include audio PIDs, video PIDs, program clock reference (PCR) PIDs, data PIDs, metadata associated with the channel or program, and/or other information associated with audio/video streams that will be received by a client device 105 after a planned audio/video transition. The PMT information may include information that may be used by the client device 105 to identify and decode audio/video associated with new audio/video content that is to be acquired after an audio/video transition. The planned audio/video transition information may be stored locally at the PMT module 210. When a time for an audio/video transition arrives, or a signal of an impending audio/video transition is received at a client device 105, or an audio/video transition otherwise occurs at the client device 105, the client device 105 may initiate acquisition of the audio/video streams arriving at the client device 105 after the audio/video transition using the planned audio/video transition information. For example, when the planned audio/video transition occurs, the client device 105 may access the previously acquired planned audio/video transition information to identify and decode information carried by the received transport stream to produce content for output to a display.

In embodiments, with PMT information retrieved from the newly acquired PMT, the client device 105 may retrieve and decode information carried by the received transport stream to produce content for output to a display. For example, the client device 105 may use the PMT information (e.g., audio PIDs, video PIDs, program clock reference (PCR) PIDs, data PIDs, metadata associated with the channel or program, etc.) to identify and decode packets from one or more media streams (e.g., audio stream, video stream, data stream, or any other elementary stream) carried by the transport stream that are used to produce an output of content for display to a user. The audio/video content may be output to a display through the output interface 215.

Figure 3:
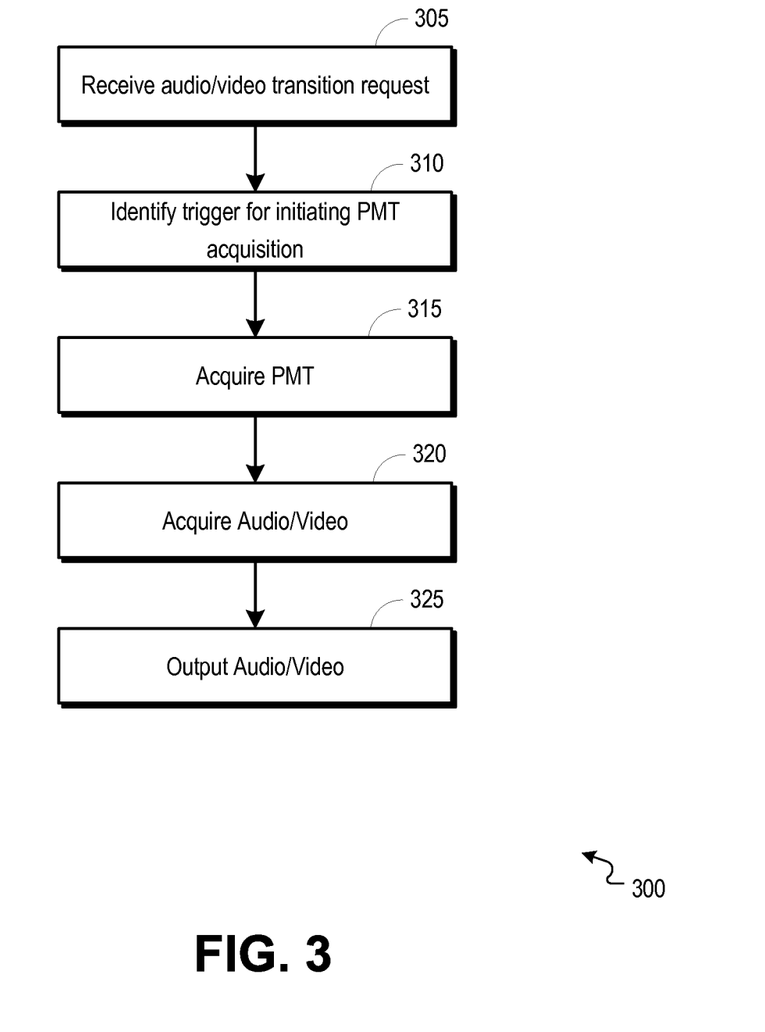
FIG. 3 is a flowchart illustrating an example process operable to facilitate PMT acquisition upon recognition of an upcoming audio/video transition.

FIG. 3 is a flowchart illustrating an example process 300 operable to facilitate PMT acquisition upon recognition of an upcoming audio/video transition. The process 300 can begin at 305, when an audio/video transition request is received. The audio/video transition request may be received at a client device 105 of FIG. 1, and may be received from within a media stream received by the client device 105 or may be received as user input from a user interface associated with the client device 105. In embodiments, the audio/video transition request may be received in the form of a channel change request, a TAD switch, changes to current audio PIDs or video PIDs, changes to audio/video parameters, and/or other conditions or events creating a need for new or updated information to be used in the acquisition of audio/video that is to be output from the client device 105.

At 310, a trigger for initiating a PMT acquisition may be identified. The trigger for initiating the PMT acquisition may be identified, for example, by a client device 105 of FIG. 1. A client device 105 may receive and decode information carried within a transport stream to produce and output audio/video associated with a channel or piece of content to a display. In embodiments, the trigger for initiating a PMT acquisition may be identified from a packet within an elementary stream (e.g., video, audio, data stream, etc.) being acted upon by the client device 105, the packet serving to indicate that a new stream is being received by the client device 105. For example, when the audio/video transition request is received, the client device 105 may receive an updated or new stream, and discontinuities introduced between the original stream and the updated or new stream before the transition may provide an indication of the transition between streams. In embodiments, the trigger may be a PCR discontinuity bit. For example, when a PCR discontinuity occurs between received packets, a PCR discontinuity bit of a packet may be set to one (1), and the client device 105 may determine that a new or updated PMT is about to be received by the client device 105 through an associated transport stream. It should be understood that other packet fields or flags may be used to provide an indication of an upcoming PMT.

At 315, a new or updated PMT may be acquired. The new or updated PMT may be acquired, for example, by a client device 105 of FIG. 1. In embodiments, the new or updated PMT may be identified and retrieved from a PMT stream within an associated transport stream. Rather than wait for a PMT polling period to expire, once the client device 105 identifies a PMT acquisition trigger, the client device 105 can acquire the next PMT that is received within the PMT stream. The client device 105 can decode the acquired PMT to receive PMT information (e.g., audio PIDs, video PIDs, program clock reference (PCR) PIDs, data PIDs, metadata associated with the channel or program, etc.) associated with the transport stream that is being received at the client device 105. The PMT information may be stored locally at the client device 105.

At 320, audio/video content may be acquired using the new or updated PMT information. In embodiments, with PMT information retrieved from the newly acquired PMT, the client device 105 may retrieve and decode information carried by the received transport stream to produce content for output to a display. For example, the client device 105 may use the PMT information (e.g., audio PIDs, video PIDs, program clock reference (PCR) PIDs, data PIDs, metadata associated with the channel or program, etc.) to identify and decode packets from the transport stream (e.g., audio and video streams carried within the transport stream) that are used to produce an output of content for display to a user. The audio/video content may be output to a display at 325.

Figure 4:
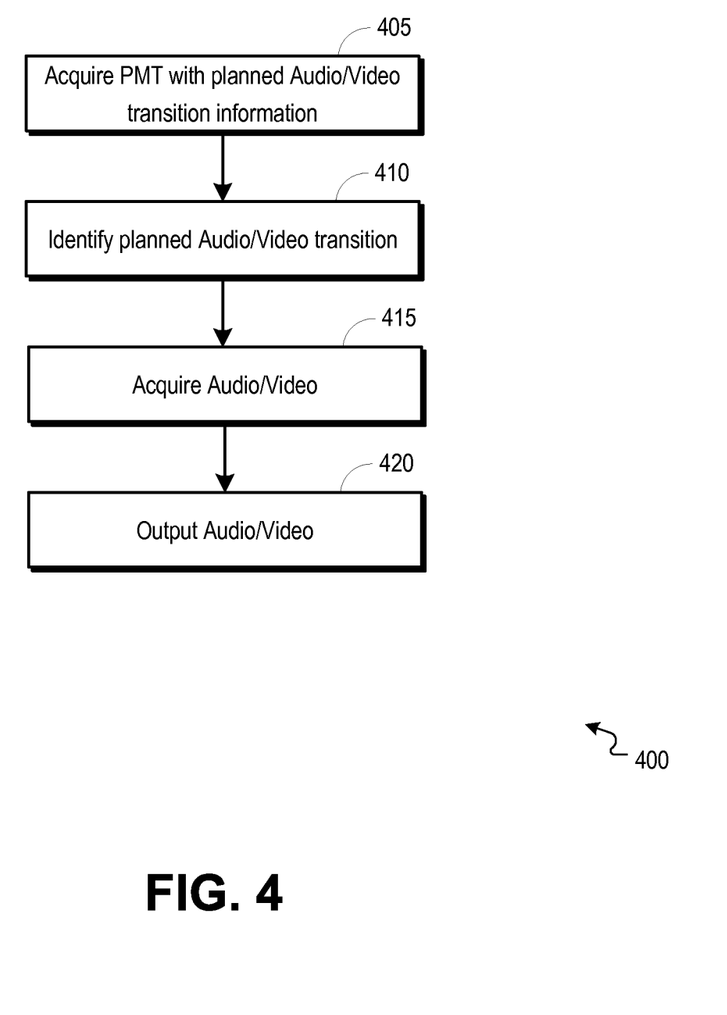
FIG. 4 is a flowchart illustrating an example process operable to facilitate a planned PMT acquisition upon recognition of an upcoming audio/video transition.

FIG. 4 is a flowchart illustrating an example process 400 operable to facilitate a planned PMT acquisition upon recognition of an upcoming audio/video transition. The process 400 can begin at 405, when a PMT having planned audio/video transition information is acquired. The PMT having planned audio/video transition information may be acquired, for example, by a client device 105 of FIG. 1. In embodiments, the PMT may be identified and retrieved from a PMT stream within an associated transport stream that is being received at the client device 105. The PMT may include information that may be used to identify an upcoming audio/video transition. The upcoming audio/video transition may be identified with respect to a time-of-day, duration associated with the received transport stream or elementary stream within the transport stream, certain packets identified within the transport stream or elementary stream, and other references.

In embodiments, the PMT having planned audio/video transition information may include PMT information (e.g., audio PIDs, video PIDs, program clock reference (PCR) PIDs, data PIDs, metadata associated with the channel or program, etc.) associated with the transport stream that is being received at the client device 105, and may further include PMT information associated with audio/video elementary streams of content that is planned to follow an identified audio/video transition. The PMT information may include information that may be used by the client device 105 to identify and decode audio/video associated with new audio/video content that is to be acquired after an audio/video transition. The planned audio/video transition information may be stored locally at the client device 105.

At 410, a planned audio/video transition may be identified. The planned audio/video transition may be identified as an audio/video transition request received at a client device 105 of FIG. 1, and may be received from within a media stream received by the client device. In embodiments, the audio/video transition request may be received in the form of a channel change request, a TAD switch, changes to current audio PIDs or video PIDs, changes to audio/video parameters, and/or other conditions or events creating a need for new or updated information to be used in the acquisition of audio/video that is to be output from the client device 105.

At 415, audio/video content associated with the content following the audio/video transition may be acquired. For example, the new audio/video content may be acquired using the PMT information associated with the new audio/video content, the PMT information being received from an earlier received PMT as planned audio/video transition information. In embodiments, when the planned audio/video transition occurs, the client device 105 may access the previously acquired planned audio/video transition information to identify and decode information carried by the received transport stream to produce content for output to a display. For example, the client device 105 may use the PMT information associated with content received after the audio/video transition (e.g., audio PIDs, video PIDs, program clock reference (PCR) PIDs, data PIDs, metadata associated with the channel or program, etc.) to identify and decode packets from the transport stream (e.g., elementary streams such as audio and video streams carried within the transport stream) that are used to produce an output of content for display to a user. The audio/video content may be output to a display at 420.

Figure 5:
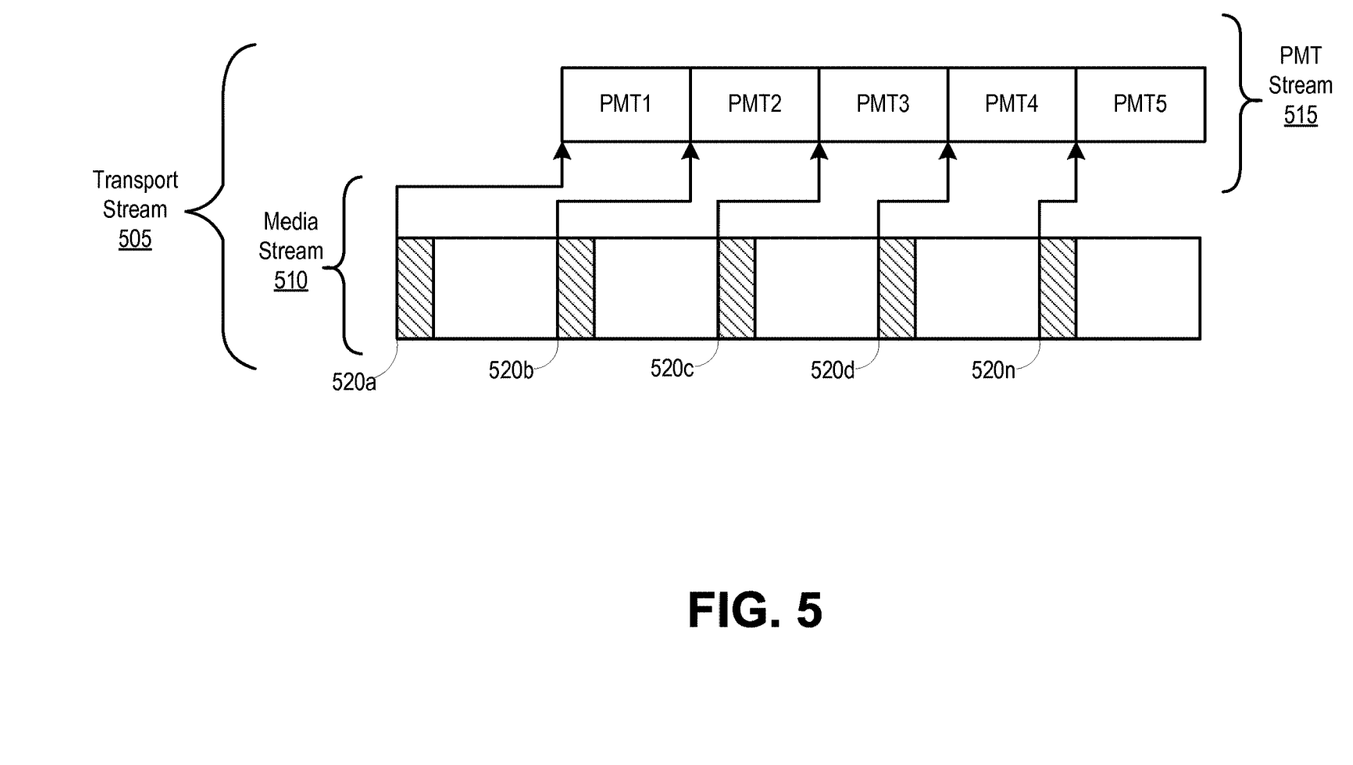
FIG. 5 is a block diagram illustrating an example transport stream including a plurality of triggers for initiating PMT acquisitions.

FIG. 5 is a block diagram illustrating an example transport stream 505 including a plurality of triggers for initiating PMT acquisitions. In embodiments, the transport stream may be received by a client device 105 of FIG. 1. The transport stream 505 may include one or more media streams 510 (e.g., audio stream, video stream, etc.) and one or more PMT streams 515.

In embodiments, multimedia content may be delivered to a client device 105 within a transport stream 505 carried by a channel (e.g., broadcast or linear channel, high-speed data channel, VoD channel, etc.). When the client device 105 is tuned to a certain channel, the client device 105 can identify and decode certain information within the transport stream 505, the certain information being associated with a piece of content that is of interest to a user.

In embodiments, a client device 105 may identify individual packets and/or streams that are to be decoded and output based upon information received from a PMT (e.g., PMT1-5). A PMT (e.g., PMT of a Moving Picture Experts Group (MPEG) transport stream) may include information associated with a channel or program such as audio PIDs, video PIDs, program clock reference (PCR) PIDs, data PIDs, metadata associated with the channel or program, and other information. In embodiments, using PMT information associated with a received transport stream 505, one or more media streams 510 (e.g., audio and/or video stream) may be identified from within the transport stream 505, the identified audio and/or video streams being associated with content that is of interest to a user.

In embodiments, when a client device 105 has acquired information used to identify and decode audio/video information for a piece of content, a condition or event may occur that creates a need for the client device 105 to acquire new information for identifying and decoding audio/video information. For example, a need for new or updated PMT information may arise due to a channel change, targeted advertisement (TAD) switch, changes to current audio PIDs or video PIDs, changes to audio/video parameters, and/or other conditions or events. In embodiments, an audio/video transition request may be received in the form of a channel change request, a TAD switch, changes to current audio PIDs or video PIDs, changes to audio/video parameters, and/or any other condition or event creating a need for new or updated information to be used in the acquisition of audio/video that is to be output from the client device 105.

In embodiments, when an audio/video transition request is received at a client device 105, packets arriving at the client device 105 after the request is received may include information that is inconsistent with the information carried by packets that were received at the client device 105 prior to receiving the audio/video transition request. The client device 105 may recognize any inconsistencies that exist between the previously received packets and the packets that the client device 105 is currently receiving. For example, a program clock reference (PCR) field associated with packets within a media stream may be used to synchronize decoding and output of the media stream 510 along with other media stream(s) carried by the transport stream 505, and when an audio/video transition occurs, the PCR field associated with the packets received after the audio/video transition may be inconsistent with or discontinuous from the packets of the previously acquired packets. The inconsistency or discontinuity in the PCR field may be introduced by setting a PCR discontinuity flag before transitioning to the new stream.

Packets received at a client device 105 after an audio/video transition request may require that the client device 105 retrieve different information or parameters to decode and/or process the new packets, thus the client device 105 may need to retrieve new or updated PMT information. In embodiments, a client device 105 may identify a trigger 520*a-n* for initiating a PMT acquisition. The trigger 520*a-n* for initiating a PMT acquisition may be identified from a packet within a media stream (e.g., video, audio, data stream, etc.) being processed by the client device 105, the packet serving to indicate that audio/video associated with content being requested at the client device 105 requires new or updated PMT information. For example, the client device 105 may identify a trigger 520*a-n* within the media stream 510, and upon identification of the trigger 520*a-n,* the client device 105 may acquire an associated PMT carried by the PMT stream 515. In embodiments, the trigger 520*a-n* may be an inconsistency or discontinuity in packets received at the client device 105. For example, the trigger 520*a-n* may be a PCR discontinuity bit, and when the PCR discontinuity bit of a packet is set to one (1), the client device 105 may determine that a new or different content stream is being received at the client device 105 and that a new or updated PMT may need to be acquired to decode and process the new or different content stream. It should be understood that other packet fields or flags may be used to provide an indication of a new content stream.

In embodiments, when a trigger 520*a-n* for initiating a PMT acquisition is identified, the client device 105 may acquire a new or updated PMT (e.g., PMT1-5). The new or updated PMT may be identified and retrieved from the PMT stream 515. The client device 105 can decode the acquired PMT to receive PMT information (e.g., audio PIDs, video PIDs, program clock reference (PCR) PIDs, data PIDs, metadata associated with the channel or program, etc.) associated with the transport stream 505 that is being received at the client device 105.

In embodiments, with PMT information retrieved from the newly acquired PMT, the client device 105 may retrieve and decode information carried by the received transport stream 505 to produce content for output to a display. For example, the client device 105 may use the PMT information (e.g., audio PIDs, video PIDs, program clock reference (PCR) PIDs, data PIDs, metadata associated with the channel or program, etc.) to identify and decode packets from one or more media streams 510 (e.g., audio stream, video stream, data stream, or any other elementary stream) carried by the transport stream 505 that are used to produce an output of content for display to a user. The audio/video content may be output to a display through the output interface 215.

Figure 6:
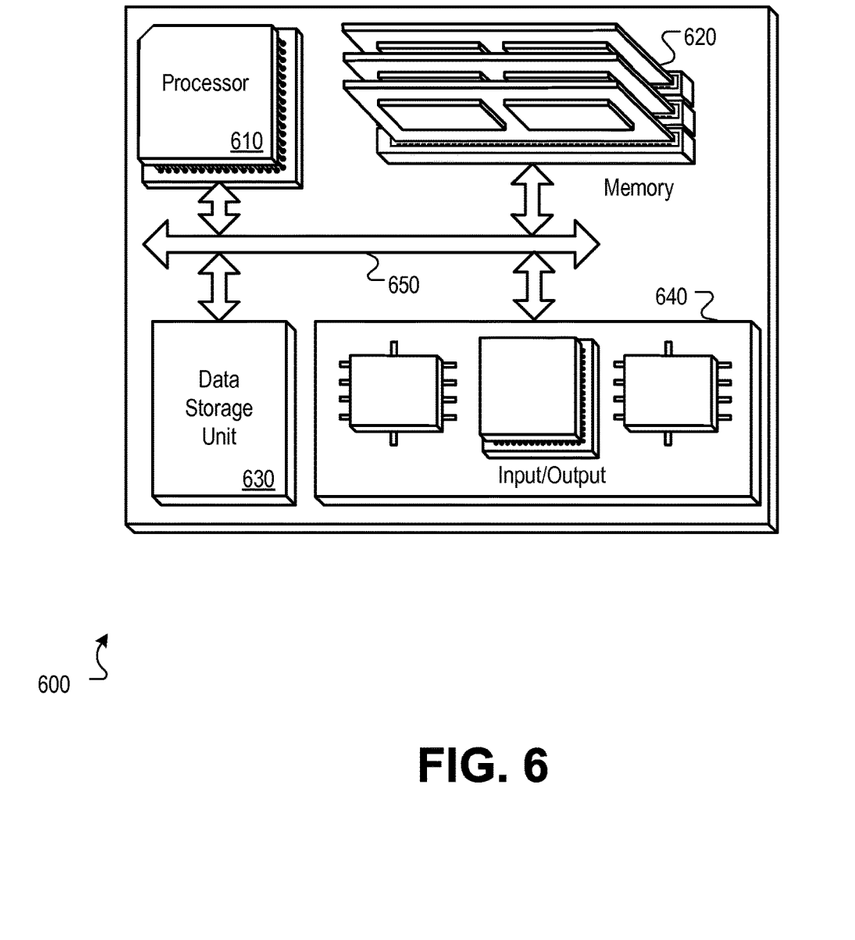
FIG. 6 is a block diagram of a hardware configuration operable to facilitate the anticipatory acquisition of PMT information.

FIG. 6 is a block diagram of a hardware configuration 600 operable to facilitate the anticipatory acquisition of PMT information. The hardware configuration 600 can include a processor 610, a memory 620, a storage device 630, and an input/output device 640. Each of the components 610, 620, 630, and 640 can, for example, be interconnected using a system bus 650. The processor 610 can be capable of processing instructions for execution within the hardware configuration 600. In one implementation, the processor 610 can be a single-threaded processor. In another implementation, the processor 610 can be a multi-threaded processor. The processor 610 can be capable of processing instructions stored in the memory 620 or on the storage device 630.

The memory 620 can store information within the hardware configuration 600. In one implementation, the memory 620 can be a computer-readable medium. In one implementation, the memory 620 can be a volatile memory unit. In another implementation, the memory 620 can be a non-volatile memory unit.

In some implementations, the storage device 630 can be capable of providing mass storage for the hardware configuration 600. In one implementation, the storage device 630 can be a computer-readable medium. In various different implementations, the storage device 630 can, for example, include a hard disk device, an optical disk device, flash memory or some other large capacity storage device. In other implementations, the storage device 630 can be a device external to the hardware configuration 600.

The input/output device 640 provides input/output operations for the hardware configuration 600. In one implementation, the input/output device 640 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a client device 105 of FIG. 1 (e.g, television, STB, computer, mobile device, tablet, etc.) or display device associated with a client device 105. In another implementation, the input/output device can include driver devices configured to send communications to, and receive communications from one or more networks (e.g., WAN 110 of FIG. 1, provider network 115 of FIG. 1, local network 120 of FIG. 1, etc.).

Those skilled in the art will appreciate that the invention improves upon methods and systems for acquiring audio/video associated with content requested at a device. Methods, systems, and computer readable media described herein can be operable to facilitate the anticipatory acquisition of PMT information. A device may recognize a trigger within a transport stream, wherein the trigger indicates an audio/video transition and initiates a PMT acquisition by the device. Upon acquisition of the PMT, the device may process information carried by the transport stream after the audio/video transition. In embodiments, a device may acquire a PMT having information associated with a planned audio/video transition, wherein the information includes a time reference for when the audio/video transition will occur and information that may be used by the device to process information carried by the transport stream after the audio/video transition.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multi-tasking and parallel processing may be advantageous.

We claim:

1. A method comprising:
receiving multimedia associated with a first piece of content through a first stream;
identifying a trigger within the first stream, wherein the trigger signals the initiation of a program map table acquisition, wherein the trigger comprises a program clock reference discontinuity flag;
in response to identifying the trigger within the first stream, acquiring a program map table from the first stream, wherein the program map table comprises information associated with a scheduled multimedia transition, wherein the information associated with the scheduled multimedia transition comprises program information associated with a second piece of content that is to be acquired after the scheduled multimedia transition, and wherein the information associated with the scheduled multimedia transition comprises information to be utilized in identifying and decoding audio and video associated with the second piece of content, wherein the information associated with the scheduled multimedia transition comprises a reference identifying a time at which the scheduled multimedia transition will occur, and wherein the program map table is acquired from the first stream before the scheduled multimedia transition occurs;
storing the information associated with the scheduled multimedia transition;
after acquiring the program map table from the first stream, identifying the scheduled multimedia transition, wherein the scheduled multimedia transition comprises a targeted advertisement switch, and wherein a second stream carrying the second piece of content is received after the identification of the scheduled multimedia transition; and
in response to identifying the scheduled multimedia transition, retrieving the stored information associated with the scheduled multimedia transition and identifying and decoding the audio and video associated with the second piece of content using the information associated with the scheduled multimedia transition, wherein the audio and video associated with the second piece of content is identified and decoded from the second stream, and wherein the second stream and the first stream are different streams.

2. The method of claim 1, wherein the program map table is acquired before an associated program map table polling period expires.

3. The method of claim 1, wherein the trigger is identified from an elementary stream within the first stream.

4. An apparatus comprising:
an interface configured to be used to receive multimedia associated with a first piece of content through a first stream; and
a module stored in memory and executed by a processor, wherein the module is configured to:
identify a trigger within the first stream, wherein the trigger signals the initiation of a program map table acquisition, wherein the trigger comprises a program clock reference discontinuity flag;
in response to identifying the trigger within the first stream, acquire a program map table from the first stream, wherein the program map table comprises information associated with a scheduled multimedia transition, wherein the information associated with the scheduled multimedia transition comprises program information associated with a second piece of content that is to be acquired after the scheduled multimedia transition, and wherein the information associated with the scheduled multimedia transition comprises information to be utilized in identifying and decoding audio and video associated with the second piece of content, wherein the information associated with the scheduled multimedia transition comprises a reference identifying a time at which the scheduled multimedia transition will occur, and wherein the program map table is acquired from the first stream before the scheduled multimedia transition occurs;
store the information associated with the scheduled multimedia transition;
identify the scheduled multimedia transition after acquiring the program map table from the first stream, wherein the scheduled multimedia transition comprises a targeted advertisement switch, wherein a second stream carrying the second piece of content is received after the identification of the scheduled multimedia transition; and
in response to identifying the scheduled multimedia transition, retrieve the stored information associated with the scheduled multimedia transition and identify and decode the audio and video associated with the second piece of content using the information associated with the scheduled multimedia transition, wherein the audio and video associated with the second piece of content is identified and decoded from the second stream, and wherein the second stream and the first stream are different streams.

5. One or more non-transitory computer readable media having instructions operable to cause one or more processors to perform the operations comprising:
receiving multimedia associated with a first piece of content through a first stream;
identifying a trigger within the first stream, wherein the trigger signals the initiation of a program map table acquisition, wherein the trigger comprises a program clock reference discontinuity flag;
in response to identifying the trigger within the first stream, acquiring a program map table from the first stream, wherein the program map table comprises information associated with a scheduled multimedia transition, wherein the information associated with the scheduled multimedia transition comprises program information associated with a second piece of content that is to be acquired after the scheduled multimedia transition, and wherein the information associated with the scheduled multimedia transition comprises information to be utilized in identifying and decoding audio and video associated with the second piece of content, wherein the information associated with the scheduled multimedia transition comprises a reference identifying a time at which the scheduled multimedia transition will occur, and wherein the program map table is acquired from the first stream before the scheduled multimedia transition occurs;

storing the information associated with the scheduled multimedia transition;

after acquiring the program map table from the first stream, identifying the scheduled multimedia transition, wherein the scheduled multimedia transition comprises a targeted advertisement switch, wherein a second stream carrying the second piece of content is received after the identification of the scheduled multimedia transition; and in response to identifying the scheduled multimedia transition, retrieving the stored information associated with the scheduled multimedia transition and identifying and decoding the audio and video associated with the second piece of content using the information associated with the scheduled multimedia transition, wherein the audio and video associated with the second piece of content is identified and decoded from the second stream, and wherein the second stream and the first stream are different streams.

6. The one or more non-transitory computer-readable media of claim 5, wherein the program map table is acquired before an associated program map table polling period expires.

7. The one or more non-transitory computer-readable media of claim 5, wherein the trigger is identified from an elementary stream within the first stream.

* * * * *